INVENTORS
ROBERT L. GRAHAM
ROBERT M. FACHINI
FENTON L. KENNA, JR.

BY Robert L. Graham
ATT'Y.

United States Patent Office 3,478,898
Patented Nov. 18, 1969

3,478,898
BALE WAGON
Robert L. Graham, Crete, Ill., and Robert M. Fachini and Fenton L. Kenna, Jr., Memphis, Tenn., assignors to International Harvester Company, Chicago, Ill., a corporation of Delaware
Filed Jan. 15, 1968, Ser. No. 697,663
Int. Cl. B65g 57/28; B66f 9/08, 9/18
U.S. Cl. 214—6                                      10 Claims

ABSTRACT OF THE DISCLOSURE

A self-propelled bale wagon having an elevator, a bale accumulator, and a bale supporting bed. The accumulator functions to accumulate bales delivered by the elevator into a tier comprising ten bales, and to deposit the same in a vertical disposition onto the bed. Gripping jaws mounted on opposite sides of the bed function to squeeze the first tier into a self-sustaining wall, the wall and gripping jaws being movable rearwardly as a load is accumulated on the bed. The bale wagon includes means for pivoting the load of bales to an upended position wherein the jaws are selectively operative to deposit the load on the ground or to deposit the load on an elevated platform.

BACKGROUND AND SUMMARY OF THE INVENTION

This invention relates generally to automatic bale wagons and more specifically to a stack-receiving bed used in automatic bale wagons.

The automatic bale wagon is a relatively recent development in the farm implement industry designed to mechanically accumulate a load of bales. The wagon may be self-propelled or towed by a tractor and may operate in conjunction with, or independently of, a field baler.

The present known bale wagons employ basically the same principle of operation which involves four distinct steps: (1) accumulate individual bales into a vertical or a horizontal row, (2) form a series of rows into a tier, (3) accumulate a series of tiers which make up a wagon load, and (4) transfer the load from the wagon to the ground.

The present invention provides for a novel bale wagon bed operable to perform steps 3 and 4.

The tier-forming mechanism (accumulator) generally operates to deliver the tier at one end of the bale wagon bed. A support associated with the bed maintains the vertical alignment of the first tier delivered to the receiving end. Now, as successive tiers are delivered to the receiving end of the bed, the preceding tiers are pushed rearwardly, the support moving along therewith to maintain alignment of the first tier. After a complete load is accumulated in this manner, the wagon is driven to a central storage area or a roadside delivery point, where the bales are transferred to the ground. Depending on the type of wagon used, the bales may be transferred in the same arrangement as accumulated or may be upended, the vertical tiers becoming horizontal layers. In either type, however, the bales are discharged by the action of a hydraulic pusher.

The present invention contemplates the use of laterally spaced gripping jaws arranged to grip the sides of the first tier of bales deposited on the receiving bed. The jaws are mounted on a carriage which moves rearwardly along the bed as successive tiers are deliever by the bale accumulator. The squeezing action of the jaws on the first tier provides a vertical support for successive tiers. When a complete load of bales is accumulated on the bed the gripping jaws are disposed at the rear of the bed so that when the bed is upended the jaws support the entire load. This particular arrangement expedites the transfer of the load to the ground which occurs merely by releasing the gripping force of the jaws and driving away from the ground deposited load and thusly eliminating the necessity of the hydraulic pusher heretofore required.

Another advantage derived from the particular arrangement is the ability of the jaws to lift the load in the upended position for depositing the load on an elevated platform such as a truck or the like. Furthermore, since the gripping jaws are designed to support the load at any longitudinal location along the bed, partial loads can be handled with ease. This feature allows the operator to select the height of the upended stacks since the number of vertical tiers accumulated on the bed determines the number of horizontal layers deposited at the delivery point.

The objects of the present invention may be summarized briefly as follows:

Provide a bale wagon bed capable of receiving a plurality of vertical tiers of bales;

Provide a bale wagon bed which functions to support a series of vertical tiers of bales in the horizontal and vertical position;

Provide a bale wagon bed which operates to accumulate tiers of bales into a load and deposit the same on the ground or on an elevated platform; and Provide a bale wagon capable of delivering a load of bales at a delivery point merely by releasing the effect of the support means.

These and other objects will become apparent to those skilled in the art from the following disclosure taken in conjunction with the attached drawings.

DESCRIPTION OF THE PREFERRED EMBODIMENT
General

The novel bale wagon bed contemplated by this invention may be considered as operating in conjunction with a bale accumulator. The particular type of bale accumulator is not important, insofar as this invention is concerned, the only requirement, being that it deliver a vertical tier of bales to the bale wagon bed.

Figure 1:
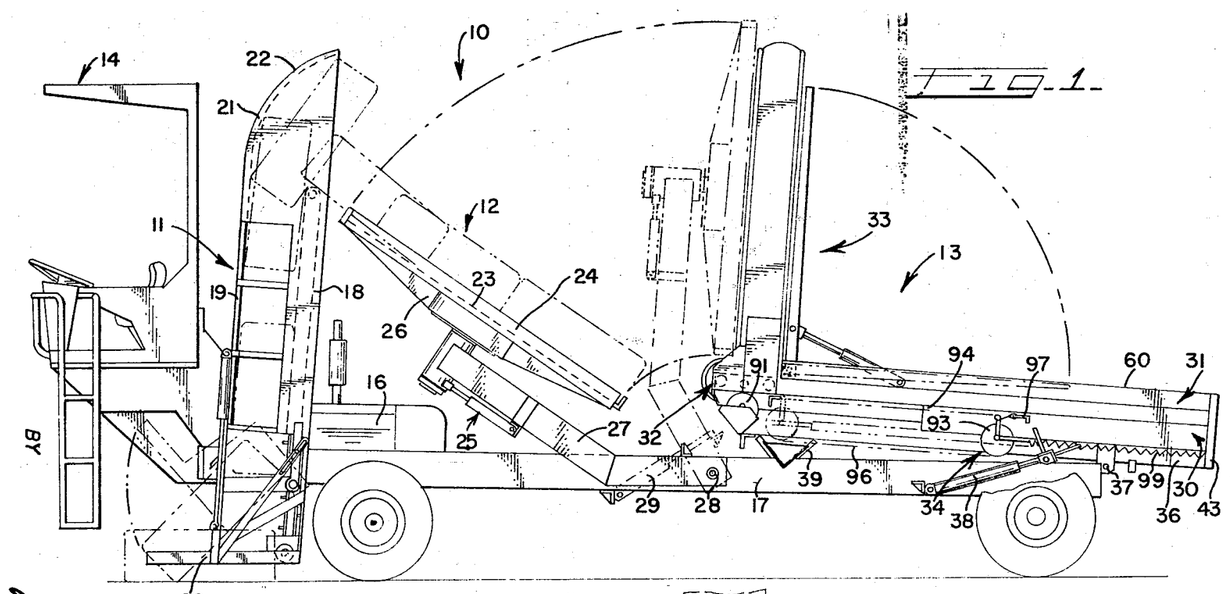
FIGURE 1 is a side elevational view of the bale wagon constructed in accordance with the principles of this invention.

Referringy to FIGURE 1, a self-propelled bale wagon 10, constructed in accordance with the principles of the present invention may be considered as having the following major components: a pickup elevator 11, a bale accumulator 12, and a bale wagon bed 13. These components as well as other incidental components such as the driver's cab 14 and the power source 16 are all supported by a longitudinally extending, wheel-mounted chassis 17. Components 11 and 12, forming no part of the present invention, will be described generally, whereas the bale wagon bed 13, the subject matter of this invention, will be described in detail.

Elevator (FIGURE 1)

The elevator 11 is mounted at the forward end of the chassis 17 and includes a conventional endless conveyor 18 housed in a bale guide frame 19. A lower end 20 of the elevator 11 is opened and disposed to register with ground supported bales, while the upper end 21 includes deflector means 22 for directing a bale onto the bale accumulator 12.

Accumulator (FIGURE 1)

The function of the bale accumulator 12, as the name suggests, is to receive individual bales from the elevator 11 and to arrange them in a tier or a layer comprising a plurality of bales (10 in this instance). The accumulator 12 includes a tilted flat surface 23, a hydraulically actuated pusher 24, a sub-structure 26 and an A-frame 27. The flat surface 23, in its home position, is disposed tilted downwardly and rearwardly so that bales received from the elevator 11 gravitate to the lower extremity of the surface 23. The pusher 24 serves to move bales laterally across the surface 23. The surface 23 and the pusher 24 are supported on the sub-structure 26 mounted on the A-frame 27 which, in turn, is hinged to the chassis 17 by connection 28.

Briefly, the accumulator 12 operates to form a ten-bale tier as follows: The first two bales are deposited in an end-to-end relation on the surface 23 forming a longitudinally extending row; the row is moved laterally across the surface 23 by the hydraulic pusher 24; this procedure is repeated until a five row, ten-bale layer is accumulated. While not germane to this invention, it should be pointed out that the sub-structure may be pivotally mounted on the A-frame 27 so that alternate rows may be indexed 90° by a crank 25. Indexing alternate tiers 90° enables the tiers to be accumulated in an interlocked pattern.

The accumulator 12 is pivotable about the hinge point 28 between a bale-receiving position (solid line position of FIGURE 1) and a tier-delivery position (broken line position of FIGURE 1). A hydraulic cylinder 29 interconnecting the chassis 17 to the A-frame 27 provides the power for moving the bale accumulator 12 between the receiving and delivery positions. Thus it will be appreciated that the elevator 11 and the accumulator 12 function to accumulate and deliver a ten-bale tier to the bale wagon bed 13.

Bale wagon bed (FIGURES 1, 2, 3, 4, 5, 6 and 7)

The bale wagon bed 13 includes generally a frame 30, a bale support structure 31, a carriage assembly 32, a gate 33, a pulley assembly 34, and a lift cylinder 35.

Figure 2:
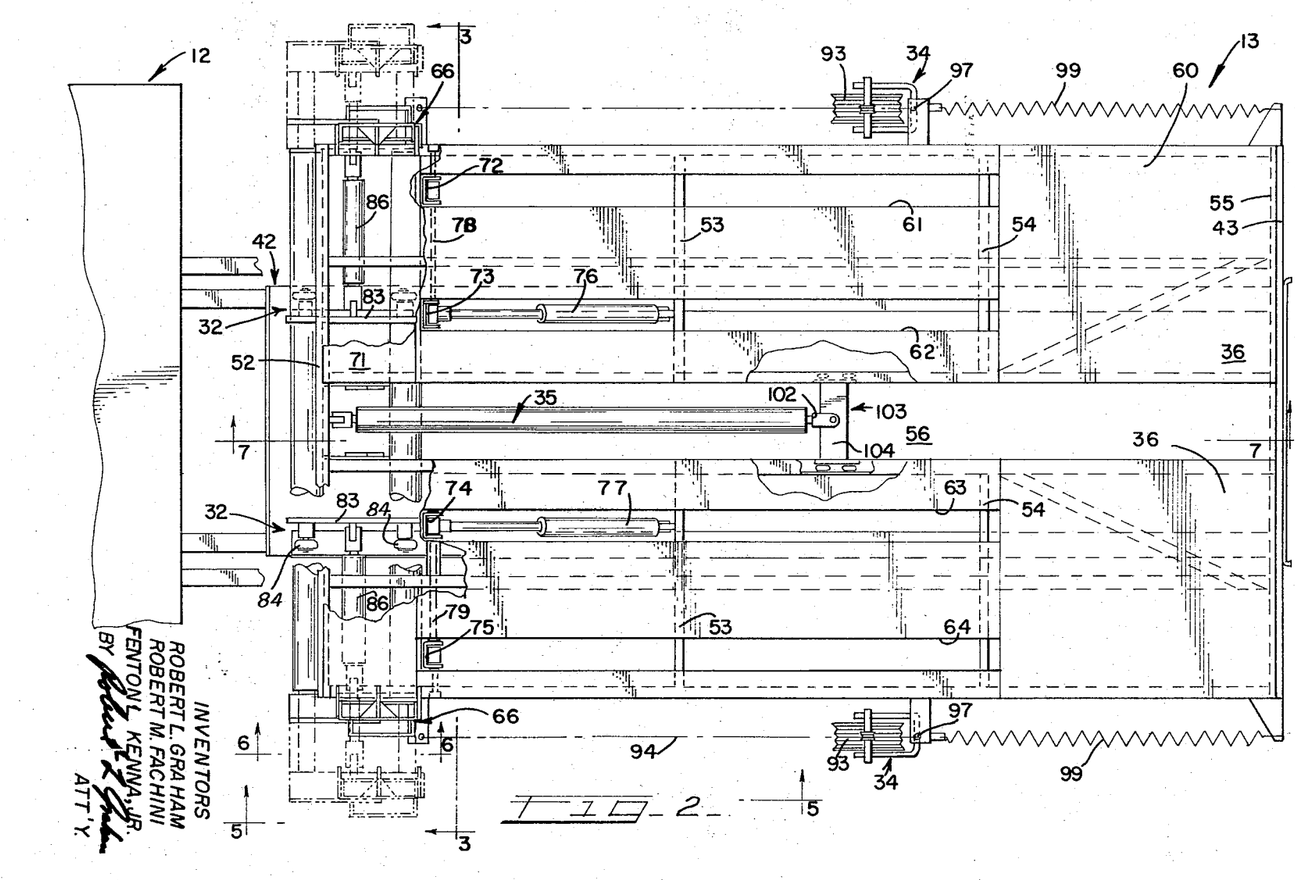
FIGURE 2 is a plan view of the bale wagon bed used in the bale wagon shown in FIGURE 1.
Figure 9:
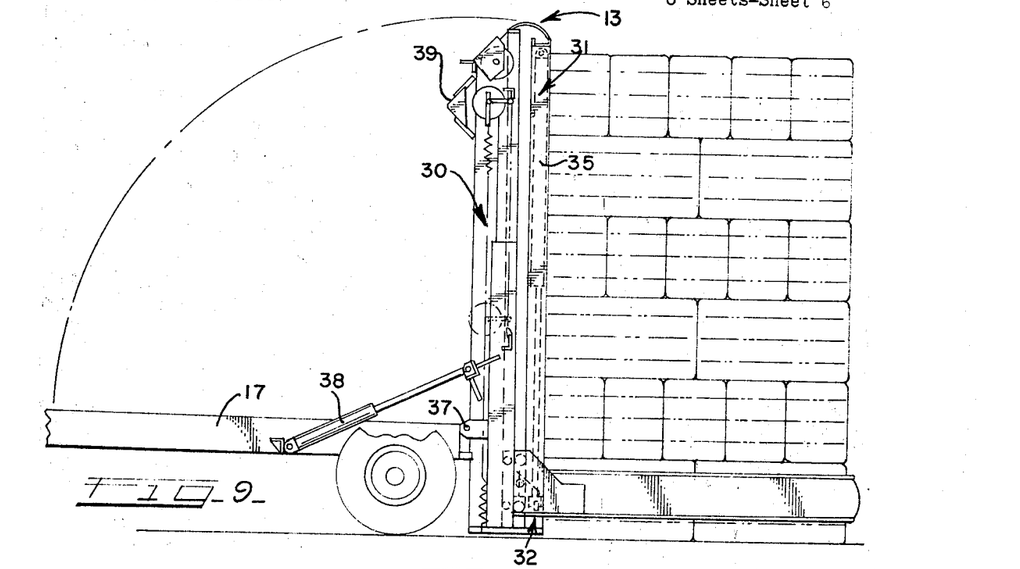
FIGURE 9 is similar to FIGURE 8 showing the bed in its upended ground delivering position.

The frame 30, comprising a pair of longitudinal members 36, 36, is pivotally mounted at the rear of chassis 17 by means of a pivot shaft 37 (see FIGURES 1 and 2). A hydraulic cylinder 38 interconnects the frame 30 and the chassis 17 and is operable to pivot the bed 13 from a generally horizontal tier-receiving position (FIGURE 1) to a vertical load delivering position (FIGURE 9). In the horizontal, tier-receiving position, the wagon bed 13 is supported at the rear by the pivot shaft 37 journaled to the chassis 17, and at the front by an angle member 39 secured to the frame 30. Details of the wagon bed 13 will be described with reference to its horizontal, tier-receiving position of FIGURE 1.

Figure 3:
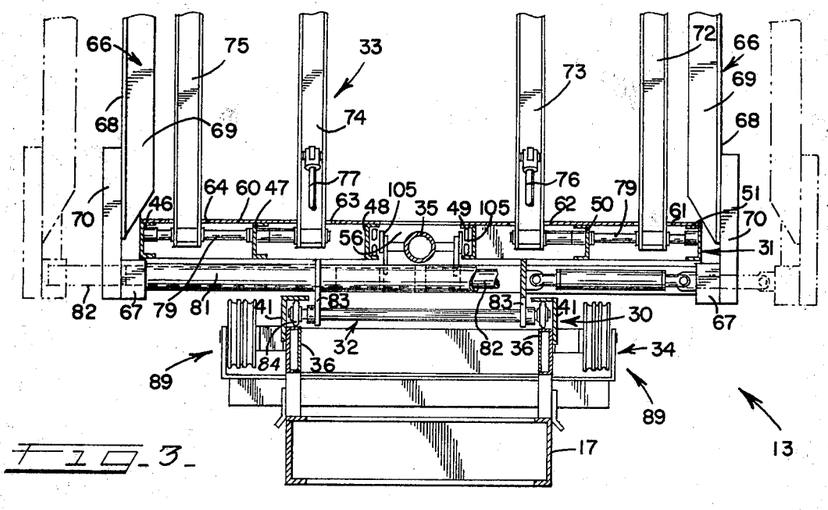
FIGURE 3 is a sectional view of the bale wagon bed taken generally along line 3—3 of FIGURE 2 and showing details of the carriage assembly mounted on the bed.
Figure 4:
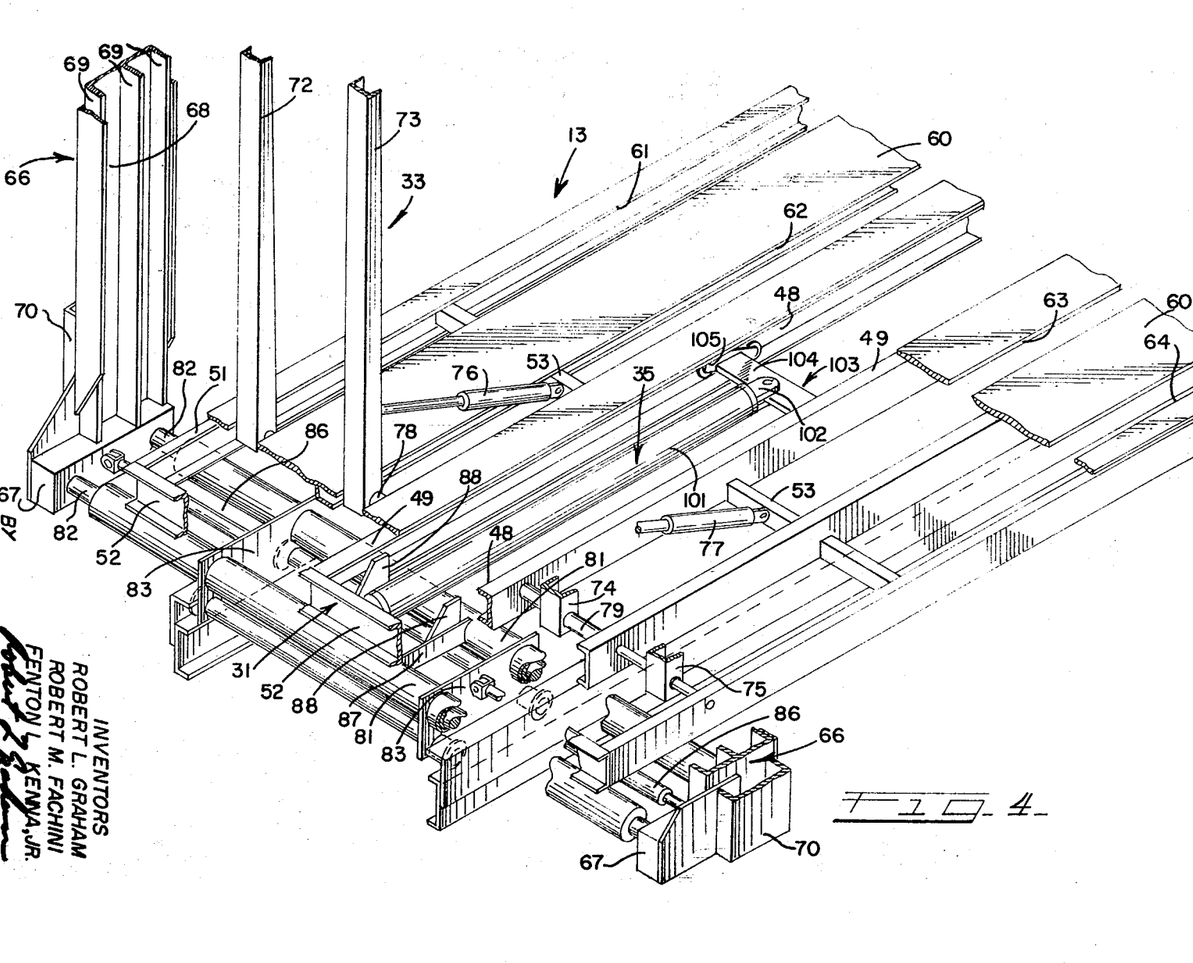
FIGURE 4 is a perspective view of the bed shown in FIGURE 2.
Figure 5:
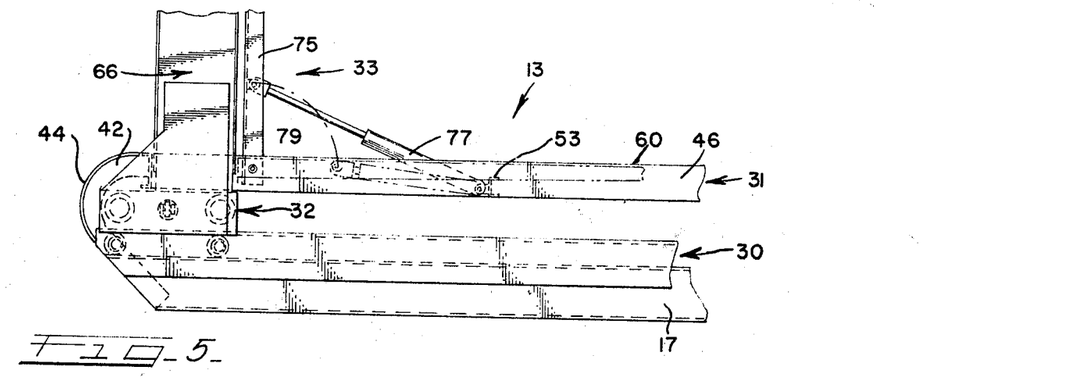
FIGURE 5 is an enlarged side elevational view of a front portion of the bale wagon bed, the plane of reference being indicated by the line 5—5 of FIGURE 2.
Figure 6:
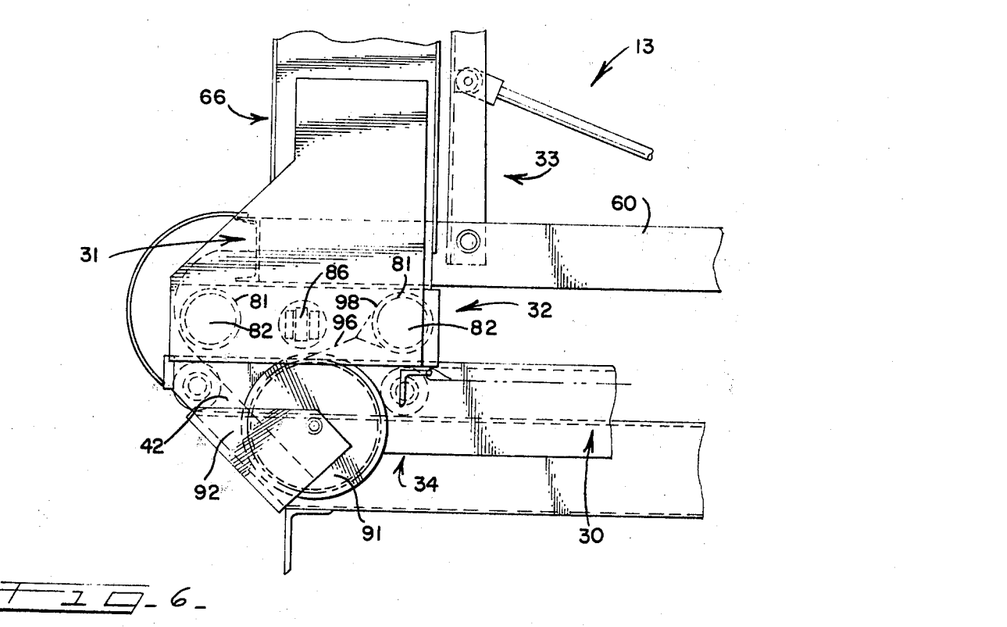
FIGURE 6 is an enlarged side elevational view similar to FIGURE 5 illustrating the pulley assembly.
Figure 7:
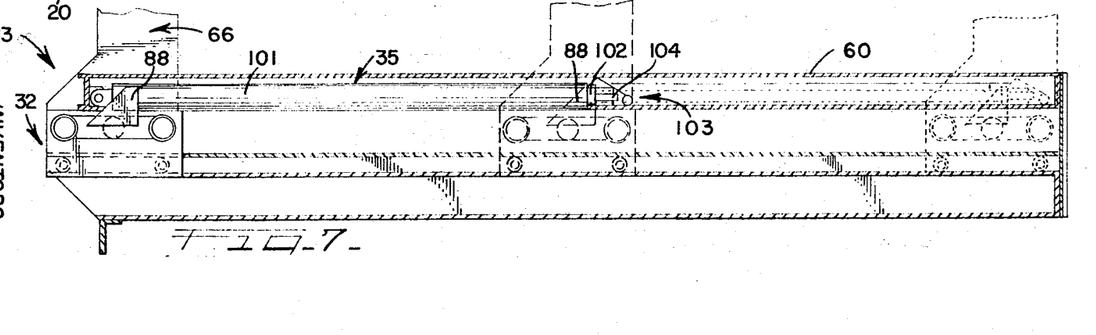
FIGURE 7 is a sectional view taken generally along line 7—7 of FIGURE 2, illustrating the lift cylinder.

As best seen in FIGURES 2, 3 and 4 the longitudinal members 36, 36 are laterally spaced and define a pair of inwardly facing channels 41, 41. The longitudinal members 36, 36 are connected at the front and rear by cross-members 42 and 43, respectively, of sufficient strength to provide a rigid rectangular frame. The forward cross-member 42 may include a curved portion 44 as shown in FIGURE 5 to guide the tiers delivered by the accumulator 12 onto the bale wagon bed 13. As shown in FIGURE 3 the inwardly facing channels 41, 41 serve to support the carriage assembly 32.

The bale support structure 31 is constructed in rectangular form comprising six longitudinal channels 46, 47, 48, 49, 50 and 51 (see FIGURE 3) and four lateral cross-members 52, 53, 54 and 55 (see FIGURE 2). The front and rear cross-members 52 and 55 are continuous members joining the six longitudinal channels 46–51 into a rigid structure, while the intermediate cross-members 53 and 54 are broken at their mid-section. Thus a longitudinal passage 56 between longitudinal channels 48 and 49 extends from the front cross-member 52 to the rear cross-member 55. The bale support structure 31 is rigidly mounted over the frame 30 by means of the frame cross-members 42 and 43.

A floor 60 comprising strips of sheet metal secured to the bale support structure constitutes the bale supporting surface. Formed in the floor 60 are four longitudinally extending slots 61, 62, 63 and 64, which cooperate to receive the gate 33 to be described presently.

The carriage assembly 32 and the gate 33 cooperate to receive a tier of bales delivered by the accumulator 12. With reference to FIGURE 3, the carriage assembly 32 includes a pair of upright gripping jaws 66, 66 extending upwardly from the floor 60 and positioned at opposite sides thereof. The jaws 66, 66 each are formed with a base member 67 which supports an upright side wall 68. The dimensions of the side walls must be such that substantial portions of each side of a tier of bales are covered thereby. The side walls 68, 68 may be provided with longitudinally extending ribs 69 which aid in the gripping ability of the jaws. The junction of the base 67 and the side wall 68 is sufficiently reinforced by members 70 to give the structure sufficient strength and rigidity.

The carriage assembly 32 is movable longitudinally along the bed 13 from a home position (FIGURE 1) wherein the jaws 66, 66 occupy their forwardmost position flanking the receiving end of the floor 60 to a fiinal position (FIGURE 8) wherein the jaws 66, 66 occupy their rearwardmost position.

Before describing the details of the carriage assembly 32, the relationship of the jaws 66, 66 and the gate 33 will be described.

As indicated above the jaws 66, 66 in their home position flank the receiving end of the floor 60 and with the gate 33 define a tier-receiving chamber 71 (FIGURE 2). The chamber 71 is opened at the front for receiving a tier of bales delivered by the accumulator 12. In this position the jaws 66, 66 are fully extended to permit the deliverance of a ten-bale tier. The gate 33 comprising four upright tines 72, 73, 74, and 75 serve to position the tier for the jaws 66, 66 to act thereon. After the tier is deposited in the chamber 71, the jaws 66, 66 are moved to their gripping position (solid line position of FIGURE 3) squeezing the sides of the tier accommodated in chamber 71 into a rigid wall. The tier now being sustained by the jaws 66, 66 no longer requires the support of the gate 33. By means of a pair of hydraulic cylinders 76 and 77 the upright tines 72, 73, 74, and 75, pivotally mounted on a pair of rockshafts 78 and 79, is collapsed through the cooperatively arranged slots 61, 62, 63 and 64 to a position below the floor 60 (broken line position of FIGURE 5).

The carriage assembly 32 functions to support the gripping jaws 66, 66 and includes hydraulic means for moving the jaws between the bale gripping position and the bale releasing position. The assembly 32 is rollably mounted on the bed 13 so that it may move longitudinally therealong and is arranged to cooperate with the lift cylinder 35 described below. As best seen in FIGURES 3 and 4 the jaws 66, 66 are supported on a pair of parallel tubes 81, 81 which extend transversely through the space separating the frame 30 and the bale support structure 31. Each of the tubes 81 substantially spans the entire width of the bale support structure 31 and carries at its opposite ends telescopically movable rods 82, 82. The outer ends of the rods 82, 82 are welded, or otherwise secured, to the base member 67 of the gripping jaw 66. As shown in FIGURE 4 each of the jaws 66, 66 are supported by a pair of laterally spaced rods 82, 82, which in turn are slidably mounted in their respective tubes 81, 81.

The tubes 81, 81 are interconnected by a pair of laterally spaced reinforcing plates 83, 83, the plates serving to tie the assembly into a rigid unit. As shown in FIGURE 3 the plates 83, 83 project downwardly between the longitudinal members 36, 36 of the frame 34 and are arranged wherein each plate 83 confronts one of the inwardly facing channels 41. Each plate 83 carries a pair of rollers 84, 84 sized to fit snugly into the channels 41. Thus it will be appreciated that the carriage assembly 32 supported on the rollers 84 mounted in the frame channels 41 moves longitudinally along the bed 13 with the tubes 81 moving in the space separating the frame 30 and the support structure 31.

A pair of hydraulic rams 86, 86 provide the power for moving the jaws 66, 66 laterally. Each ram 86 interconnects its associated plate 83 and the base 67 whereby extension of the ram moves the jaw 66 laterally outwardly from the floor 60. The rams 86, 86 are simultaneously actuated so that they move in opposite directions on a given signal. Thus retraction of the rams 86, 86 moves the gripping jaws 66, 66 inwardly imparting a squeezing force on the tier situated therebetween, whereas extension of the rams 86, 86 releases the gripping force on the tier.

Additional rigidity is provided by a pair of supports 87, 87 which interconnect the tubes 81, 81 near their midsections (see FIGURE 4). Projecting upwardly from each support 87 is a flange 88. The flanges 88, 88 extend vertically into the space between the inwardly facing longitudinal members 48 and 49 and provide a linkage between the carriage assembly 32 and the lift cylinder 35, the importance of which is discussed below.

In order to return the assembly to its home position wherein the gripping jaws 66, 66 flank the receiving end of the floor 60, a pair of pulley assemblies 34, 34 are provided (see FIGURES 1, 2, 3 and 6). As best seen in FIGURE 3 the assemblies 34, 34 are mounted on opposite sides of the frame 30 and function to maintain a bias force on the carriage assembly 32 at laterally spaced points. Since the structure and the function of the assemblies 34, 34 are identical, only one will be described herein with like reference numerals being assigned to corresponding parts.

Each assembly 34 includes, generally, a stationary pulley 91 rotatably mounted on a bracket 92 connected to the cross-member 42, and a traveling pulley 93 slidably carried on a guide 94 extending adjacent the longitudinal member 36. A cable 96 has one end anchored to the frame 30 as at 97 and another end anchored to the carriage assembly 32 as at 98 (see FIGURE 6). A coil spring 99, interconnecting the traveling pulley 93 and the frame cross-member 43, urges the pulley 93 rearwardly with respect to the bed 13. The cable 96 is trained about the pulleys so that a forwardly directed biasing force is imposed on the carriage assembly 32, thereby urging the assembly toward its home position. The combined strength of the springs 99, 99 is such that without resistance the carriage assembly 32 is moved to the home position, but with the resistance presented by the frictional engagement of a tier of bales on the floor 60 the pulley assemblies 34, 34 are incapable of moving the carriage 32 forwardly. As a load of bales is accumulated on the bed 13, the traveling pulley 93 moves forwardly in increments corresponding to the rearward movement of the carriage assembly 32 to the fully loaded position of FIGURE 8.

Figure 10:
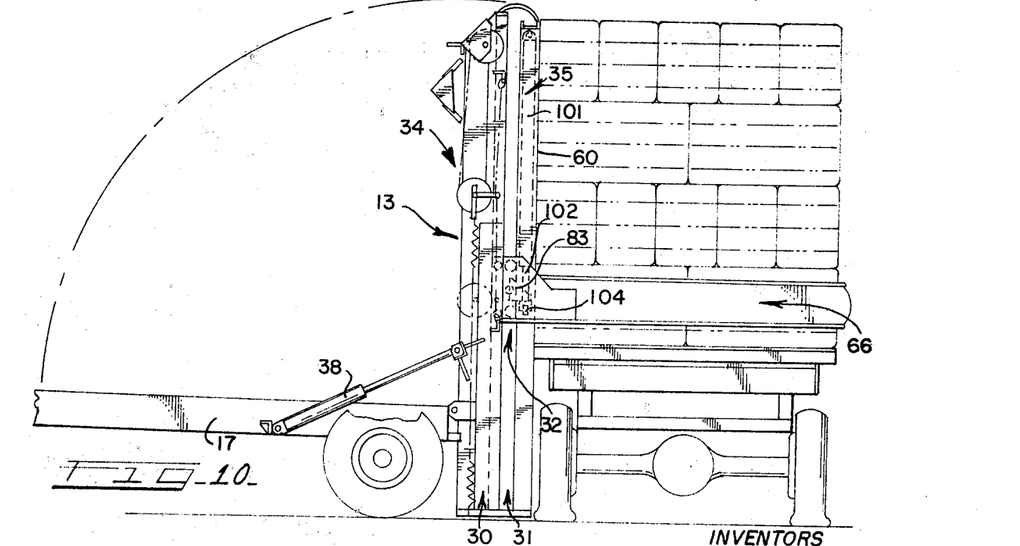
FIGURE 10 shows the bed in its upended position delivering a load to an elevated truck bed.

As previously indicated the lift cylinder 35 cooperates with the carriage assembly 32 to provide means for elevating the upended load of bales. The lift cylinder 35 is disposed within the confines of the bale support structure 31, having a cylinder portion 101 anchored to the forwardmost cross-member 52 and a rearwardly extending piston rod 102 supported on a roller assembly 103 (see FIGURES 2, 3, 4, and 7). The roller assembly 103 includes a horizontal plate 104 which interconnects two pairs of rollers 105, 105, which in turn are rollably mounted in the inwardly facing channels 48 and 49. The horizontal plate 104 is disposed in the path of movement of the upwardly extending flanges 88, 88 secured to the carriage assembly 32. Now as the assembly 32 moves rearwardly the flanges 88, 88, upon reaching the longitudinal location of the roller assembly 103 (broken line position of FIGURE 7) engage the plate 104 at spaced points. Continued rearward movement of the carriage assembly 32 carries the roller assembly 103 therewith, causing the piston rod 102 to extend from the cylinder 101. Movement of the carriage assembly 32 to its rearwardmost position on the bed 13 (dotted line position of FIGURE 7) pulls the piston rod 102 to its fully extended position. This places the lift cylinder 35 in a condition for elevating the load with the bed in its upended position. Retraction of the piston rod 102 into the cylinder 101, through the engagement of the horizontal plate 104 upon the flanges 88, 88, pulls the carriage assembly 32 therewith (see FIGURE 10).

OPERATION

Figure 8:
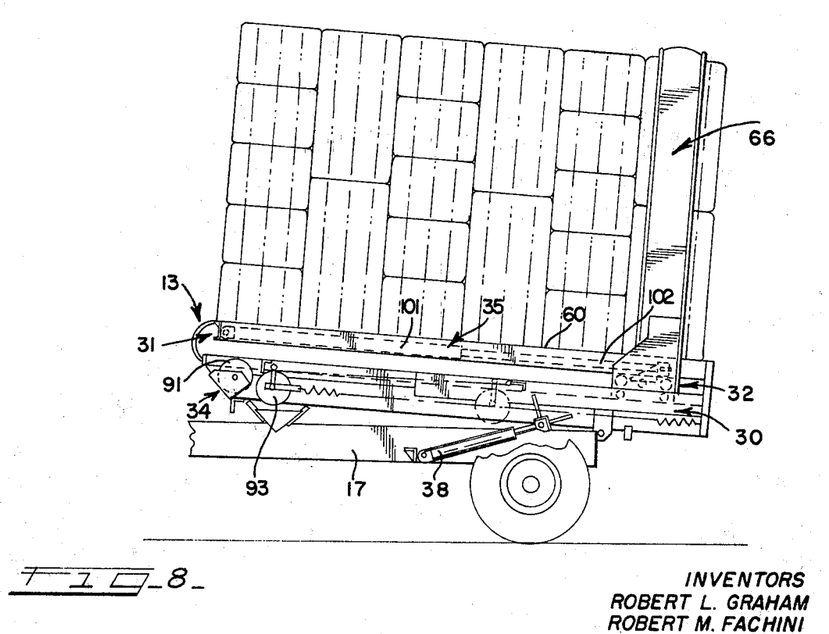
FIGURE 8 is a side elevational view of the bed shown with a full load of bales.

The operation of the bale wagon will be described with reference to FIGURES 1, 5, 7, 8, 9 and 10. As the self-propelled bale wagon 10 is driven through the field, ground-supported bales are picked up by the elevator 11 and deposited on the bale accumulator 12 which operates to form a ten-bale layer. The ten-bale layer is then pivotally delivered to the bale wagon 13 being deposited as a vertical tier on the floor 60 between the gripping jaws 66, 66. As the first tier is thusly deposited, the spaced jaws 66, 66 (in their extended position) and the gate 33 maintain the vertical attitude of the tier. The cylinders 86, 86 are then actuated moving the gripping jaws 66, 66 inwardly squeezing the tier together. Next, the gate 33 is pivoted to its collapsed position by actuation of the hydraulic cylinders 76, 77. After accumulating another ten-bale tier, the accumulator 12 again is actuated, pivotally delivering a second tier to the receiving end of bed 13. The force of the accumulator in delivering the second tier pushes the first tier and carriage assembly 32 rearwardly. The grip maintained by the gripping jaws 66, 66 causes the first tier and the carriage assembly 32 to move rearwardly as a unit. Rearward movement of the carriage assembly 32 pulls the traveling pulleys 93, 93 forwardly tensioning their respective coil springs 99, 99. However, the frictional resistance presented by the bale tier engagement upon floor 60 exceeds the tension force created by springs 99, 99. Successive tiers are similarly formed and delivered to the bale wagon bed 13 until a complete load is accumulated as shown in FIGURE 8. It should be noted that during the rearward movement of the carriage assembly 32 the flanges 88, 88 engaging the plate 104 has pulled the piston rod 102 to its fully extended position. With the full load accumulated on the bale wagon bed 13, the bale wagon 10 is driven to a central storage area where the load may be deposited on the ground or loaded onto a hauling truck. If it is desired to deposit the load on the ground the unloading procedure is as follows: the bed 13 is upended by the actuation of the cylinder 38 placing the bottom tier (first tier) in engagement with the ground; the jaws 66, 66 are moved laterally outwardly by the actuation of cylinders 86, 86 releasing the grip on the bottom tier; and the truck is then pulled away from the load. If it is desired to deposit the load on the platform of the truck, the unloading procedure is as follows: the bed 13 is upended; the lift cylinder 35 is actuated to lift the load to an elevation slightly above the bed of the truck; the bale wagon is then backed up so that the load overlays the bed of the truck; the lift cylinder 35 then is lowered depositing the bale load on the truck bed; next the gripping force of the jaws 66, 66 is released; and the truck is driven away.

Although this preferred embodiment has been described in particular detail it should be observed that variations and modifications may be made therein without departing from the scope and spirit of the invention.

What is claimed is:

1. A bale wagon for automatically accumulating a load of bales, said wagon comprising:
   a bale accumulator for receiving bales and arranging them in a tier, said accumulator being movable to deliver said tier;
   means for delivering bales to said accumulator;
   a bed having one end disposed for receiving a tier delivered by said accumulator, wall means for squeezing said tier into a self-sustaining tier,
   means for moving said wall means rearwardly along said bed to move said tier therealong as successive tiers are delivered by said accumulator.

2. A bale wagon as recited in claim 1 wherein said wall means comprises
   a pair of upright, spaced walls flanking said bed, and
   means for changing the spacing between said walls whereby a tier may be received therebetween at the maximum spacing and may be squeezed therebetween at a minimum spacing.

3. A bale wagon as recited in claim 2 wherein the means for changing the spacing of said upright walls comprises hydraulic cylinders extendable to effect the maximum spacing and retractable to effect the minimum spacing.

4. A bale wagon including a mechanism for delivering a vertical tier of bales, and
   a longitudinally extending floor having one end disposed for receiving said vertical tier delivered by said mechanism;
   a pair of upright gripping jaws flanking said floor and disposed at said receiving end for receiving said tier therebetween, said jaws being relatively movable laterally for gripping said tier received therebetween and movable longitudinally as a unit relative to the floor as successive tiers are delivered to the receiving end, the gripped tier providing a support for the successive tiers.

5. A bale wagon as recited in claim 4 and further comprising means for upending said floor to a load delivering position wherein said gripping jaws are disposed generally horizontal and grippingly support the entire load;
   means for releasing the gripping force of the gripping jaws whereby the upended load is deposited on the ground.

6. A bale wagon bed for handling bales arranged in vertical tiers, said bale wagon bed comprising:
   a longitudinal floor for supporting said tiers; and having a forward end and a rear end;
   means for receiving and retaining a tier delivered to said forward end including
   a carriage movable along said floor between said forward end and said rear end, said carriage including a pair of upright gripping jaws at the lateral sides of said floor, at least one of said jaws being movable relative to the other of said jaws between a first position for receiving a tier therebetween delivered to said forward end and a second position for gripping said tier therebetween;
   means for moving said carriage from said forward end to said rear end in response to the formation of succeeding tiers, the gripped tier providing support for the succeeding tiers;
   means for transferring the formed tiers from said floor to the ground.

7. A bale wagon bed as recited in claim 6 wherein said transfer means includes means for upending said floor and said carriage, the gripped tier becoming the bottom tier positioned adjacent the ground, means for moving the gripping jaws to its first position thereby depositing the tiers on the ground.

8. A bale wagon bed as recited in claim 7 and further comprising
   a lift cylinder secured to said floor and operably connected to said carriage with said floor in said upended position for lifting said jaws and said supported tiers to an elevated point of deposition,
   whereby said means for moving said jaws to said first position are actuated thereby releasing said grip on said tier at said elevated point.

9. A bale wagon bed for use in an automatic bale wagon of the type having a mechanism for delivering a vertical tier of bales, said bale wagon bed comprising:
   a longitudinally extending floor having one end disposed for receiving said vertical tier delivered by said mechanism;
   a pair of upright gripping jaws flanking said bed and disposed at said receiving end for receiving said tier therebetween, said jaws being relatively movable laterally for gripping said tier received therebetween and movable longitudinally as a unit as successive tiers are delivered to the receiving end, the gripped tier providing a support for the successive tiers;
   means for upending said floor to a load delivering position wherein said gripping jaws are disposed generally horizontal and grippingly support the entire load;
   means for releasing the gripping force of the gripping jaws whereby the upended load is deposited on the ground; and
   means for moving the gripping jaws along the upended floor thereby lifting the load for depositing same on an elevated platform.

10. A bale wagon bed for use in an automatic bale wagon of the type having a mechanism for delivering a vertical tier of bales, said bale wagon bed comprising:
    a longitudinally extending floor having one end disposed for receiving said vertical tier delivered by said mechanism;
    a pair of upright gripping jaws flanking said bed and disposed at said receiving end for receiving said tier therebetween, said jaws being relatively movable laterally for gripping said tier received therebetween and movable longitudinally as a unit as successive tiers are delivered to the receiving end, the gripped tier providing a support for the successive tiers; and
    a gate mounted on said floor and extending upwardly therefrom, said gate in cooperation with said upright jaws defining a tier chamber at said receiving end, said gate being movable to a collapsed position below said floor, said movement being responsive to the gripping action of said gripping jaws.

References Cited

UNITED STATES PATENTS

| | | | |
|---|---|---|---|
| 3,278,055 | 10/1966 | Stoltz | 294—63 X |
| 2,578,802 | 12/1951 | Heidrick et al. | 214—512 |
| 2,736,443 | 2/1956 | Seidle | 214—146.5 |
| 2,768,018 | 10/1956 | Ehmann | 214—653 X |
| 3,159,287 | 12/1964 | Stroup. | |
| 3,186,567 | 6/1965 | Blair | 214—510 |
| 3,251,485 | 5/1966 | Fancher. | |
| 3,272,352 | 9/1966 | Adams et al. | |
| 3,373,882 | 3/1968 | Forest. | |

GERALD M. FORLENZA, Primary Examiner

ROBERT J. SPAR, Assistant Examiner

U.S. Cl. X.R.

214—77, 501, 653, 672